(12) United States Patent
Freitag et al.

(10) Patent No.: US 7,296,677 B2
(45) Date of Patent: Nov. 20, 2007

(54) PACKAGING FOR MULTIPLE MEDIA DISCS

(75) Inventors: Ken Freitag, Cheshire, MA (US); James Kostyun, Pittsfield, MA (US); Ralph S. Peterson, Clifton Forge, VA (US)

(73) Assignee: Meadwestvaco Corporation, Glen Allen, VA (US)

( * ) Notice: Subject to any disclaimer, the term of this patent is extended or adjusted under 35 U.S.C. 154(b) by 388 days.

(21) Appl. No.: 10/919,135

(22) Filed: Aug. 16, 2004

(65) Prior Publication Data

US 2006/0032767 A1    Feb. 16, 2006

(51) Int. Cl.
    *B65D 85/57*    (2006.01)
(52) U.S. Cl. .................. 206/311; 206/307.1; 206/308.1
(58) Field of Classification Search ............. 206/307.1, 206/308.1, 309, 311, 312, 387.13, 473
    See application file for complete search history.

(56) References Cited

U.S. PATENT DOCUMENTS

| | | | |
|---|---|---|---|
| 4,709,812 A | 12/1987 | Kosterka | |
| 4,823,950 A | 4/1989 | Roze | |
| 5,291,990 A | 3/1994 | Sejzer | |
| 5,322,162 A * | 6/1994 | Melk | ........................... 206/310 |
| 5,344,008 A | 9/1994 | DeBlasio et al. | |
| 5,575,387 A | 11/1996 | Gelardi | |
| 5,697,498 A | 12/1997 | Weisburn et al. | |
| 5,799,782 A | 9/1998 | Gelardi | |
| 6,024,215 A * | 2/2000 | Leung | ..................... 206/308.1 |
| 6,106,015 A | 8/2000 | Udwin et al. | |
| 6,179,121 B1 | 1/2001 | Ferguson et al. | |
| H1954 H | 4/2001 | Takashima | |
| 6,296,112 B1 | 10/2001 | Pettey | |
| 2002/0014421 A1* | 2/2002 | Byrne et al. | .............. 206/308.1 |
| 2003/0106814 A1 | 6/2003 | Gelardi et al. | |
| 2005/0145515 A1* | 7/2005 | Gelardi et al. | ........... 206/308.1 |
| 2005/0274636 A1* | 12/2005 | Choi | ........................ 206/308.1 |

FOREIGN PATENT DOCUMENTS

CH        678370 A    8/1991

* cited by examiner

*Primary Examiner*—David T. Fidei

(57) ABSTRACT

A package includes a stack of hinged trays for holding media discs, having a flexible hinge member affixed to the hinge edges of the trays, mounted in a protective container having a base, a spine and a cover. The bottom tray in the stack is mounted in the base for pivotal movement about the tray edge opposite the hinge edge, whereby, as trays are pivoted about the flexible hinge member from the stack onto a second stack, the hinge edge of the bottom tray pivots away from the base when the second stack contains at least one more tray than the original stack. Pivotal mounting is achieved by providing a slot on the bottom tray which engages slot receiving means mounted on the base.

14 Claims, 6 Drawing Sheets

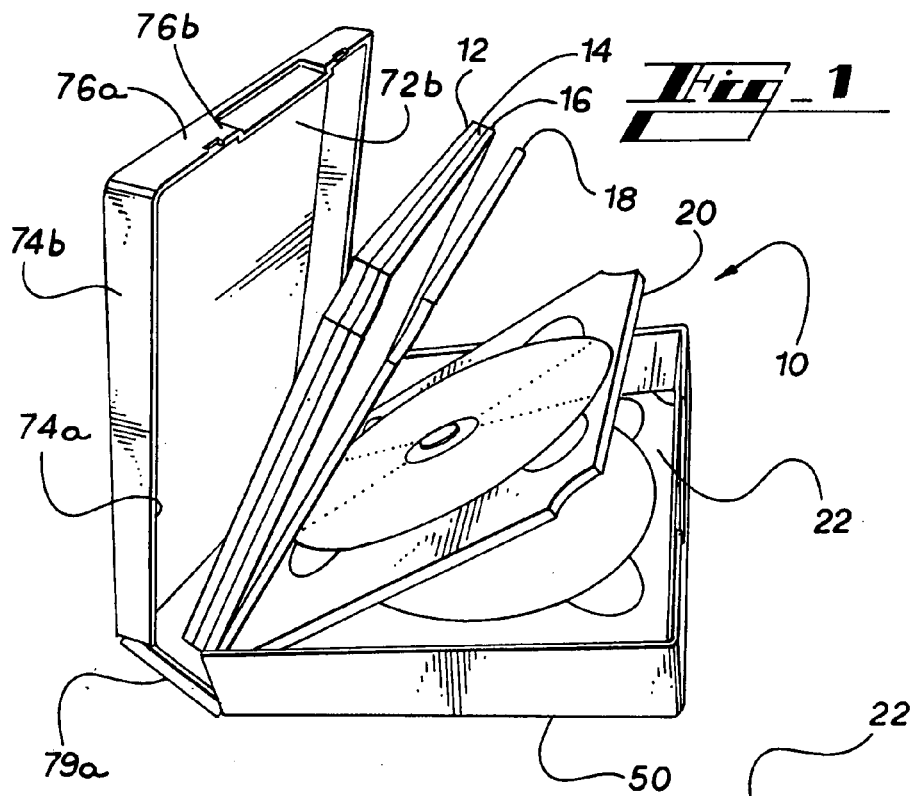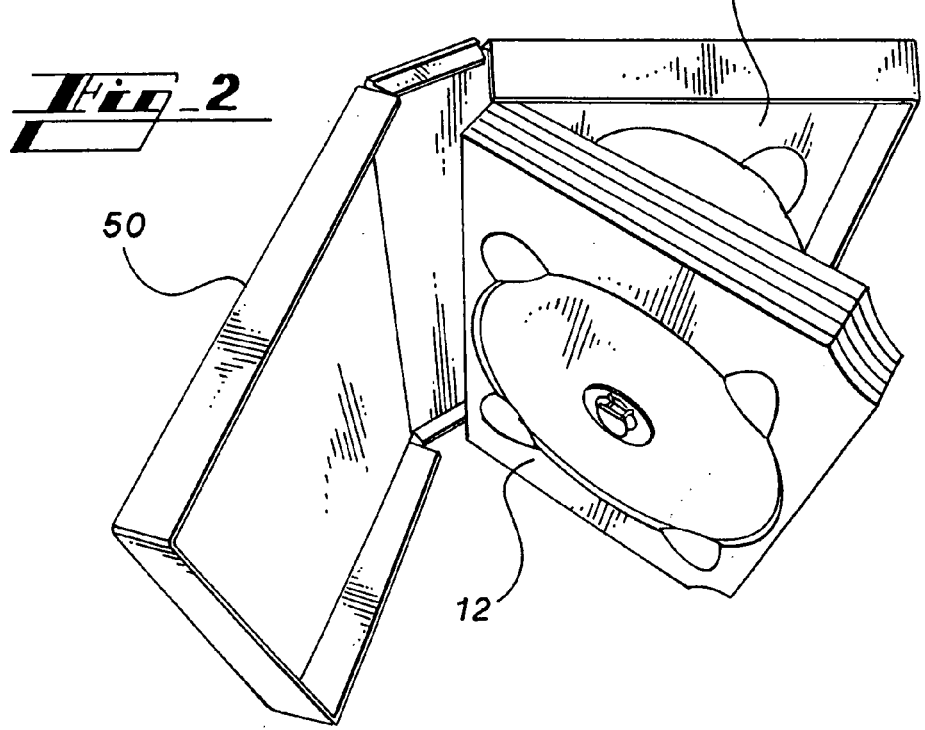

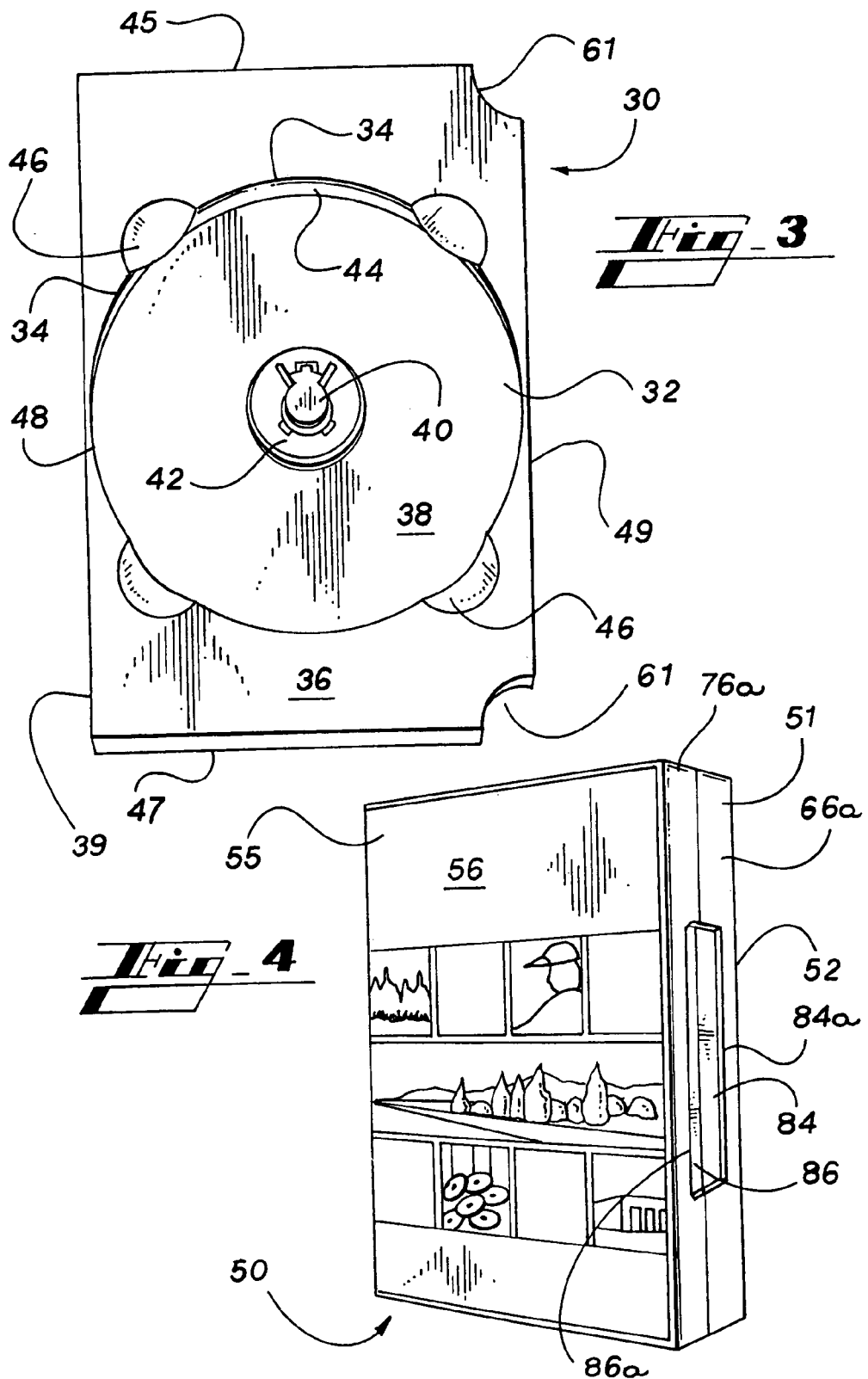

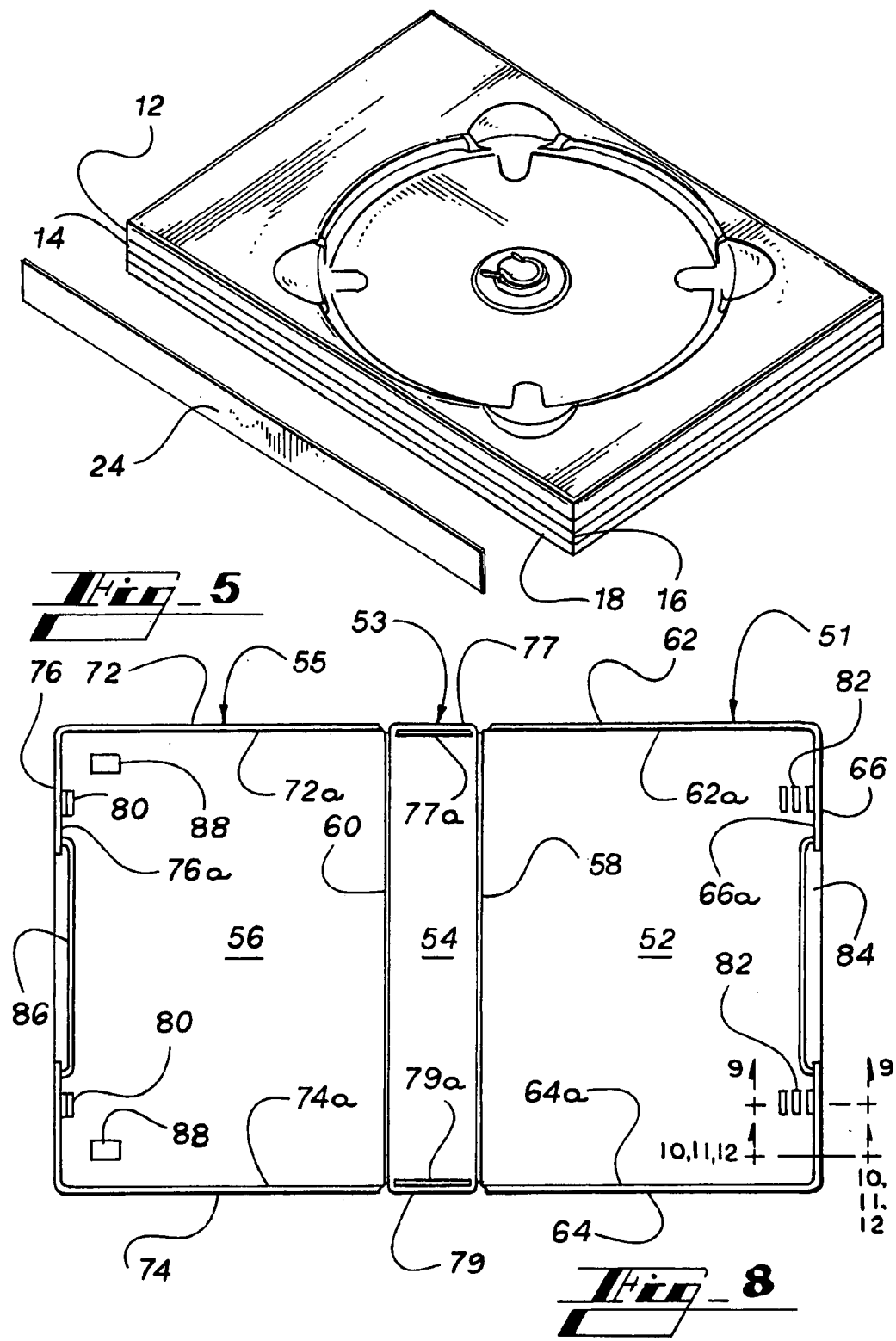

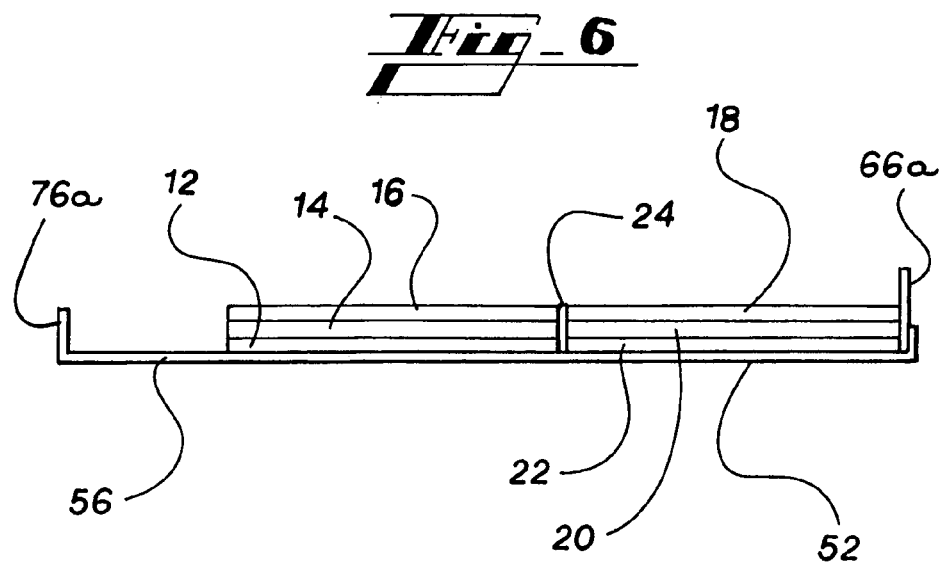
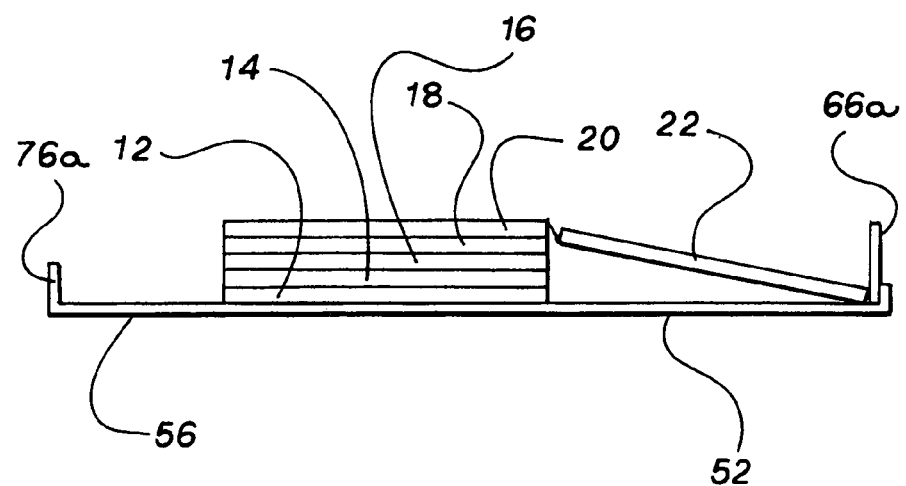

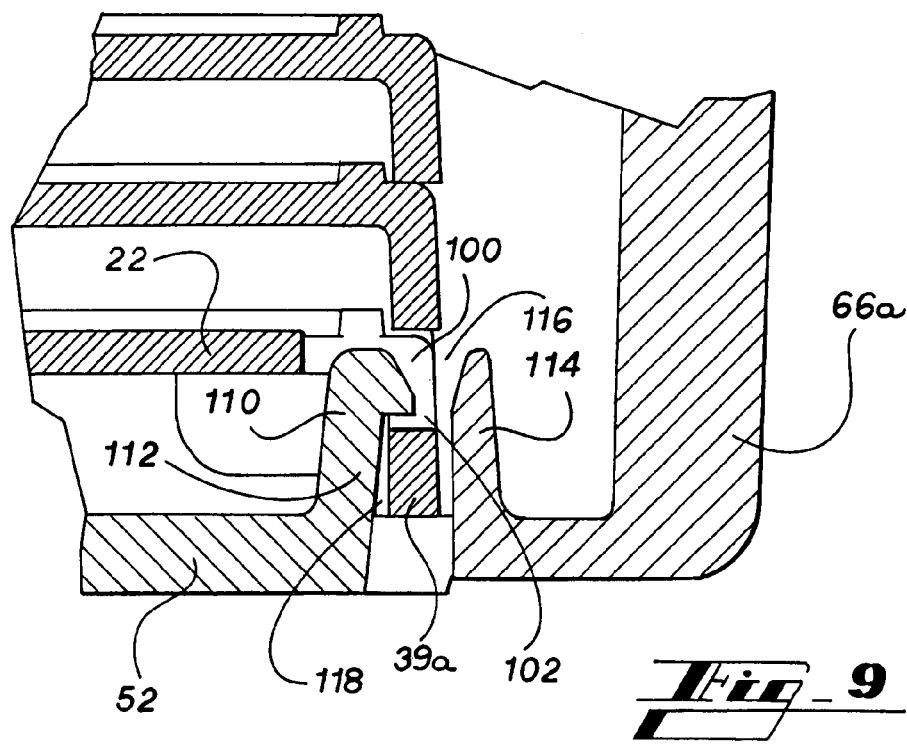
Fig_9
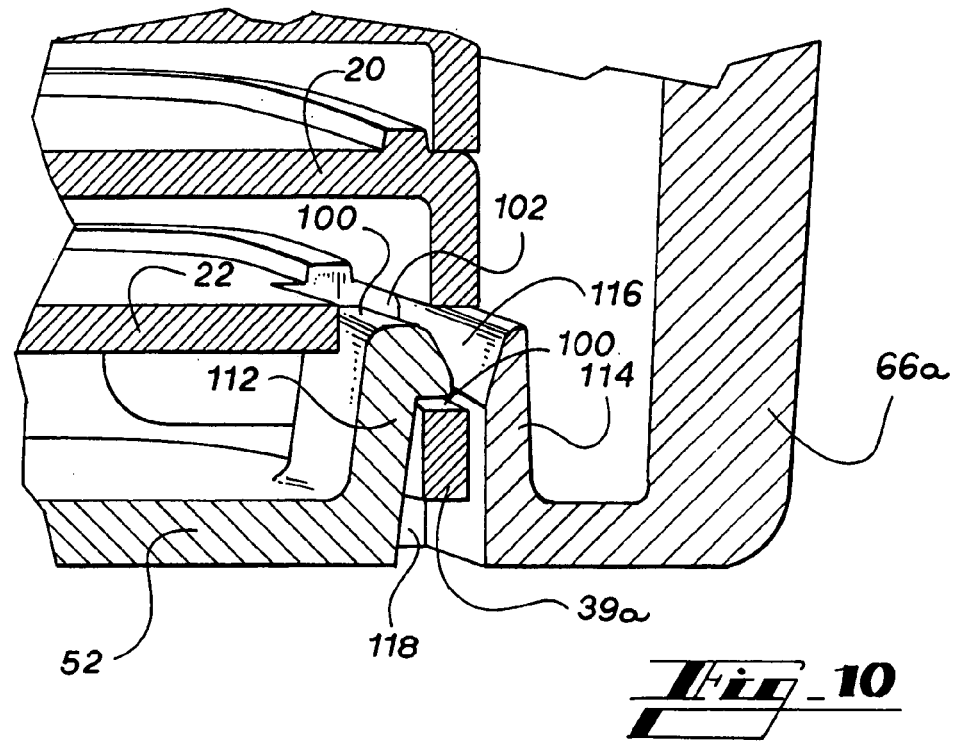
Fig_10

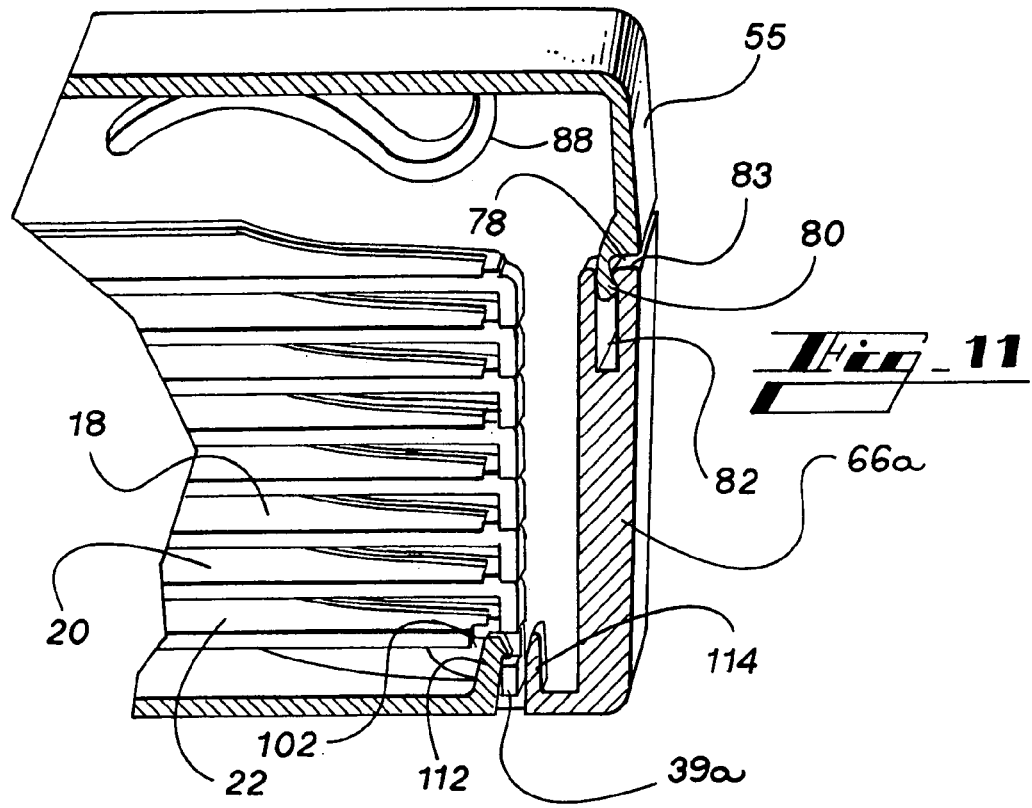
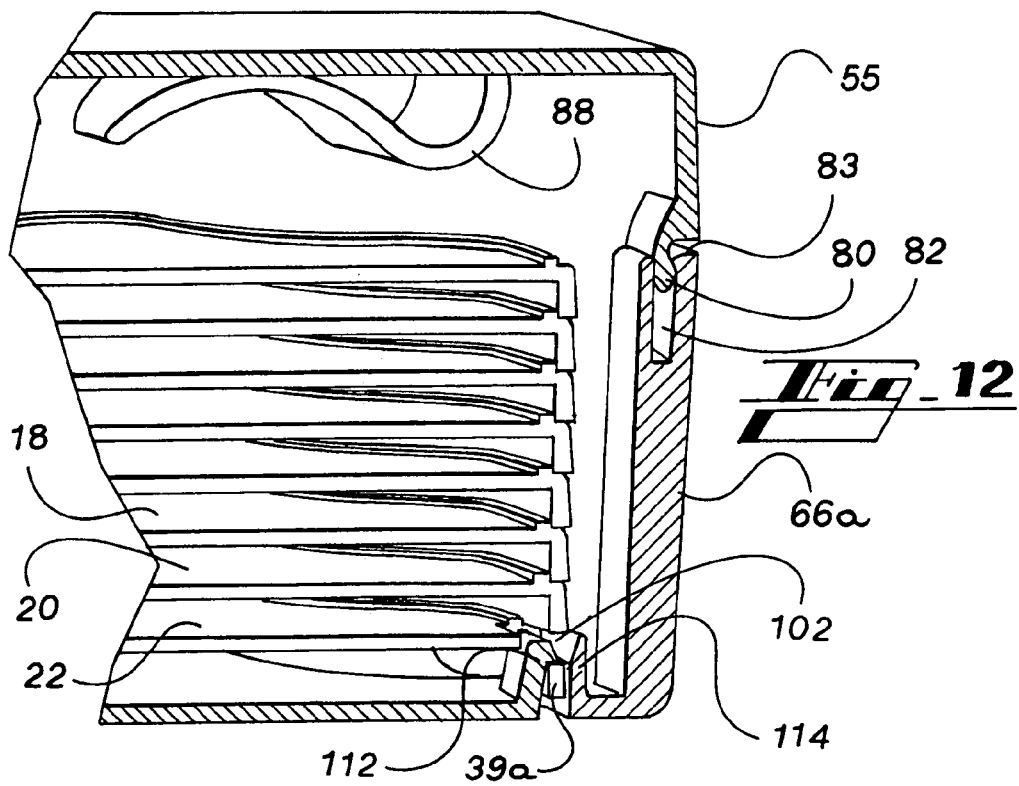

PACKAGING FOR MULTIPLE MEDIA DISCS

FIELD OF THE INVENTION

The present invention relates to a hinged stacked array of trays for holding media discs and, more particularly, to a container containing such a hinged stacked array of trays.

BACKGROUND OF THE INVENTION

Trays are often used as storage means for media discs, such as compact discs (CDs), digital versatile discs (DVDs) and similarly shaped disc-like information storage media. As used herein, the term "media disc" refers to a compact disc (CD), digital versatile disc (DVD), or other disc-shaped media item that is used to store analog or digital information. A useful configuration for packaging multiple media discs is a stacked array of trays. In a stacked array, the hinge edges of the trays are aligned with each other in the stack and a flexible hinge member is affixed to the hinge edges to hinge the trays to each other. Frequently, the stack of trays is mounted onto an interior panel of a jacket with the underside of the bottom tray affixed to the panel, while the jacket is folded around the stack of trays to close the package. When the trays are pivoted from the single stack configuration about the flexible hinge member to form a second stack, as the second stack becomes taller than the first stack, so long as the attachment of the bottom tray to the panel remains intact, stresses are created on the flexible hinge member which cause it to separate from the hinge edges of the trays. At the same time, stresses are placed upon the means, such as adhesives, attaching the underside of the bottom tray to the panel, causing the jacket to pull away from the bottom tray. Whether the resulting damage is to the flexible hinge member or to the cover, both of which are undesirable, the integrity of the overall package is destroyed with possible damage to the media discs stored within the stacked trays.

Packages which include a hinged stack of disc-holding trays are disclosed in International Publication No. WO 03/050812, the disclosure of which is incorporated herein by reference. It would be advantageous to design a package which is not susceptible to the type of damage discussed hereinabove, will prevent damage to and pilferage of the media discs, and into/from which the media discs can readily be inserted and removed.

Accordingly, there exists a need for an economical, simple and effective package for storing a hinged, stacked array of trays for holding media discs which will not be damaged by pivoting of the trays from a single stack to form a second stack.

SUMMARY OF THE INVENTION

It is, therefore, a primary object of the present invention to provide a package including a stack of hinged trays for holding media discs mounted within a protective container, which is economical, simple and easy to use, and which will not be damaged by pivoting of the trays about the flexible hinge member.

It is also an object of the present invention to provide a package including a protective container for the stack of hinged trays for holding media discs into which media discs may be easily inserted and from which media discs may be easily removed.

It is another object of the present invention to provide such a package wherein the bottom tray in the stack of hinged trays for holding media discs is pivotally mounted within the protective container to permit the bottom tray in the stack to pivot upwardly on its spine side after a majority of the trays in the stack are pivoted about the flexible hinge to form a second stack of trays.

It is yet another object of the present invention to provide such a package including means on the base panel of the protective container for engaging means on the non-spine side of the bottom tray for pivotally mounting the bottom tray within the protective container.

The foregoing and other objects are achieved in accordance with the present invention by providing a package for holding media discs, comprising:

a stack of disc-holding trays including at least a top tray and a bottom tray, each tray in the stack having means for receiving and holding a media disc thereon, each tray in the stack having a hinge edge and an opposite edge, the hinge edges of the trays being aligned with each other, and a flexible hinge member affixed to the hinge edges, the flexible hinge member hinging the trays to each other at the hinge edges;

an enclosure comprising a base, a spine and a cover for receiving said stack of disc-holding trays within said base with said hinge edges adjacent said spine and said opposite edges remote from said spine, said enclosure having an open position in which media discs can be inserted onto and removed from the disc-holding trays and said trays can pivot about said flexible hinge member to form a second stack of trays and a closed position in which said cover is pivoted about said spine to enclose the stack of disc-holding trays within said base;

the bottom tray in said stack of disc-holding trays being mounted in said base for pivotal movement about said opposite edge;

whereby, with the enclosure in its open position, as trays are pivoted about said flexible hinge member from said stack onto a second stack, the hinge edge of said bottom tray pivots away from said base when said second stack contains at least one more tray than the original stack.

In another aspect of the invention, there is provided a package including first means on said bottom tray and second means on said base, said first and second means interengaging for mounting said bottom tray for pivotal movement in said base.

In still another aspect of the invention, there is provided a package wherein said first means is a slot formed in and extending along said opposite edge of said bottom tray, a portion of said tray remaining below said slot, and said second means comprises means mounted on said floor panel and extending upwardly therefrom, said upwardly extending means having an upwardly opening pivot bore therein, said bore extending in a direction substantially parallel to said opposite edge of said bottom tray and being dimensioned to receive and pivotably retain the portion of said tray remaining below said slot.

In yet another aspect of the invention, there is provided a package in which the slot is formed along the intersection of the planar surface of the bottom tray and a flange depending from the opposite edge of the planar surface of the bottom tray and in which the upwardly extending means comprises a pair of generally parallel posts upstanding from said base panel, said posts being spaced apart at their upper and lower portions a distance at least equal to the width of said depending flange and being spaced apart intermediate their upper and lower portions a distance less than the thickness of said depending flange, whereby the depending flange portion below said slot is inserted into the space between said slots and pressed downwardly until said depending flange portion is forced past the intermediate narrower space between the posts into the space between their lower portions.

BRIEF DESCRIPTION OF THE DRAWINGS

FIG. 1 is a side perspective view of the package for holding media discs of the present invention in an open configuration with the disc-holding trays fanned into an open position.

FIG. 2 is a front perspective view of the package for holding media discs of the present invention with the disc-holding trays fanned into an open position, and with the package sitting on one side edge.

FIG. 3 is a perspective view of a single disc-holding tray suitable for use in accordance with the present invention.

FIG. 4 is a perspective view of the package shown in FIG. 1 in a closed configuration.

FIG. 5 is a perspective view of a stack of disc-holding trays and a hinge member in accordance with the present invention.

FIG. 6 is a front elevational view of the package for holding media discs of the present invention wherein some of the trays have been pivoted off of the original stack, forming two stacks of approximately equal height.

FIG. 7 is a front elevational view of the package for holding media discs of the present invention wherein all but one of the trays have been pivoted off of the original stack, leaving only the bottom tray on the original stack.

FIG. 8 is a plan view of the protective enclosure of the present invention without a stack of media discs therein.

FIG. 9 is a partial side elevational view of the package of the present invention cut away along a plane extending through 9-9 in FIG. 8 showing only the lower few trays and the manner in which the lower tray is pivotally mounted within the base.

FIG. 10 is an enlarged perspective view of the package of the present invention cut away along a plane extending through 10-10 in FIG. 8 showing only the lower few trays and the manner in which the lower tray is pivotally mounted within the base.

FIG. 11 is a perspective view of the package of the present invention cut away along a plane extending through 11-11 in FIG. 8 showing the tray stack within the protective enclosure and the manner in which the cover is snap fit onto the base.

FIG. 12 is another perspective view of the package of the present invention cut away along a plane extending through 12-12 in FIG. 8 showing the tray stack within the protective enclosure and the manner in which the cover is snap fit onto the base.

DESCRIPTION OF THE PREFERRED EMBODIMENT

FIG. 1 shows a side perspective view, and FIG. 2 shows a front perspective view, of a media package 10 according to the present invention. The media package 10 includes a plurality of disc-holding trays 12, 14, 16, 18, 20 and 22 arranged in a stack. As shown in FIG. 5 the trays are hinged to each other by a flexible hinge member 24 that is affixed to one side of the stack of trays. In accordance with the present invention, the hinged stack of trays is pivotally mounted in the interior of a protective container 50, such as the well-known clamshell enclosure, to form the package of the present invention.

The hinge member 24 is fabricated from a suitable material, such as a styrene-based film or tape, polyethylene, polypropylene, or the like. The hinge member 24 may be fabricated, for example, from a strip of commercially available poly tape. The hinge member 24 must be flexible enough to allow the stack of trays to be opened and closed freely, as by pivoting the upper tray, and each succeeding tray, in order, about the flexible hinge to form a second stack of trays next to the original stack of trays, as shown in FIGS. 6 AND 7. In addition, the hinge member must be strong enough to prevent premature failure of the hinge member or separation of the hinge member from trays in the stack. The hinge member may be affixed to the trays using an adhesive, or using a mechanical technique, including techniques using ultrasound or heat.

FIG. 3 shows a perspective view of a tray 30 that is suitable for use in a media package according to the present invention. The tray 30 is a rectangular, relatively thin plate-like member, which is formed with a circular central recess 32 that is shaped to closely receive a media disc and is defined by a circular side wall 34 extending downwardly from surrounding planar surface 36 to base 38. A peripheral flange 39 depends from planar surface 36 abut the entire periphery of tray 30. A rosette 40 for gripping a media disc and holding it within recess 32 is molded on raised seat 42 which, itself, is molded on base 38. Rosette 40 may be any conventional rosette well known in the art for engaging the central opening of a media disc placed thereon. Raised seat 42 provides a circular surface on which the annular area of the media disc which is immediately adjacent the central disc aperture can be supported above the base 38. This area of the media disc typically contains no recorded information and, therefore, contact between the media disc in this area and the raised seat will not damage the media disc. The media disc may also be peripherally supported at its outer edges by optional peripheral shelf 44 formed in circular side wall 34. The outer edges of a media disc also, typically, contain no recorded information and supporting media discs at their outer edges provide further assurance that contact of the recorded areas of the media disc with the base will be avoided. Planar surface 36 of tray 30 includes diametrically opposed finger wells 46 which communicate with the base 38 of recess 32 to facilitate a user removing a media disc from the recess 32. Recess 32, rosette 40 and finger wells 46 are well known in the media disc packaging art and need not be described in detail herein.

The tray 30 includes an edge 48, referred to herein as a "hinge edge" that is used to hinge the tray 30 to other trays. The hinge edge 48 is positioned such that when a plurality of trays are stacked on top of each other, the hinge edges are aligned to receive a hinge member, such as the hinge member 24 shown in FIG. 5. Opposite to the hinge edge 48 is the non-spine edge 49. At the corners defined between the non-spine edge 49 and the top edge 45 and bottom edge 47 of the tray, arcuate cutouts 61 are formed to assist in pivoting the trays when they are stacked.

The style, shape, and dimensions of the tray 30, including the number and location of finger wells therein and the design of the rosette 40, may be varied and are not limited in any way by this disclosure. The tray 30 may suitably be fabricated from a plastic material that has been injection molded. Suitable materials for the tray include polystyrene and polypropylene. If desired, the tray 30 can be fabricated from a clear material, such as crystalline polystyrene. The use of a clear material is often desired from an aesthetic point of view. Further, the use of a transparent material for the trays allows a user to see promotional and informational materials which may be affixed to the underside of a tray and to quickly determine which of the trays are empty and which are full.

Referring now to FIGS. 1, 2, 4 and 8, it can be seen that the protective container 50 consists of a base 51 having a base panel 52, a spine 53 having a spine panel 54 and a cover 55 having a cover panel 56, in which the base panel 52 and cover panel 56 are separated from the spine panel 54 by fold lines or creases 58, 60, respectively. Preferably, these fold lines or creases are formed during fabrication as living hinges. The protective container 50 may suitably be fabricated from a plastic material that has been injection molded. Suitable materials for the tray include polystyrene and polypropylene. If desired, the protective container 50, like tray 30, can be fabricated from a clear material, such as crystalline polystyrene. Two opposite lateral sides 62, 64 and one connecting transverse side 66 have connected wall portions 62a, 64a, 66a upstanding from base panel 52 to enclose base panel 52 on three sides (not including the spine side). The height of the wall portions 62a, 64a, 66a is at least sufficient to enclose the stack of trays which is stored on base panel 52 and the tray stack within the base is oriented in such a manner that the hinge edges 48 of the trays are disposed in close alignment with living hinge 58 and the opposite edges of the trays (non-spine edges) are adjacent the transverse side wall portion 66a (non-spine side) of the base panel 52.

Two opposite lateral sides 72, 74 and one connecting transverse side 76 of cover panel 56 have upstanding, connected wall portions 72a, 74a, 76a to enclose cover panel 56 on three sides (not including the spine side). The height of the wall portions 72a, 74a, 76a is desirably less than the height of the corresponding wall portions on the base panel 52 since the cover panel 56 and its wall portions merely serve as a lid for the base panel 52 and its wall portions. In a preferred form of the invention, the upper end portions of wall portions 72a, 74a, 76a are cut away on their outside to define a peripheral outside shoulder 78 about these wall portions. The remaining upper end portions 72b, 74b, 76b of wall portions 72a, 74a, 76a are positioned a greater distance inside the marginal edge of the cover panel 56 than are the wall portions 62a, 64a, 66a of the base 51 such that, when the cover 55 is pivoted about living hinge 60 and then the spine 53 and the cover 55 are pivoted about living hinge 58 to enclose the stack of trays on base panel 52, the upper end portions 72b, 74b, 76b of wall portions 72a, 74a, 76a nest within the wall portions 62a, 64a, 66a of the base 51. Two opposite lateral sides 77, 79 of spine panel 53 have upstanding wall portions 77a and 79a which are positioned a greater distance inside the marginal edge of the spine panel 54 than are the wall portions 62a, 64a, 66a of the base 51 and the wall portions 72a, 74a, 76 of the cover 55. In this configuration, when the cover 55 is pivoted about living hinge 60 and then the spine 53 and the cover 55 are pivoted about living hinge 58 to enclose the stack of trays on base panel 52, the spine wall portions 77a, 79a are disposed interiorly of wall portions 72a, 74a, 76a of the cover 55 and wall portions 62a, 64a, 66a of the base 51. With the stack of trays pivotally secured in base 51, and with the protective container 50 in the open configuration, notwithstanding that the tray stack is enclosed on three sides by wall portions 62a, 64a, 66a, it is a simple matter to pivot the trays from the stack to a second stack using arcuate cutouts 61.

With the walls of the cover 55 nested within the walls of the base 51, the protective container 50 and package 10 are in the closed configuration. In this configuration, the outside of the upper end portions 72b, 74b, 76b of the wall portions of cover 55 are immediately adjacent the inside of the wall portions of base 51. In this way, transversely extending rod-like protrusions 80 on the outside of the cover transverse upper wall portion 76b engage correspondingly located upwardly opening, transversely extending bores 82 on the inside of the base transverse wall portion 66a to permit the cover and base to snap fit together for forming a media disc package 10 which can be maintained in the closed position. As can be seen in FIGS. 11 and 12, communicating with each of bores 82 is an upwardly opening insertion slot 83, preferably in the form of a truncated cone, which has a width at its upper edge at least as wide as the diameter of the rod-like protrusion 80 and which tapers towards the bore 82 so that as cover 55 is closed, rod-like protrusion 80 is inserted into the top edge of slot 83 and then forced downwardly past the narrow portion of the slot into the bore 82. To facilitate opening of the closed package 10, corresponding wall recesses 84, 86 are formed in the outside wall of transverse wall portions 66a, 76a of the base and cover, respectively, i.e., in the wall portions remote from the spine 53. These recesses allow the user to have gripping edges 84a, 86a to assist in pulling the base and cover apart when their respective protrusions/bores 80, 82 are engaged with the protective container 50 in the closed position.

The stack of trays is pivotally secured in the base 51 of protective container 50 by pivotally attaching the bottom tray 22 to the base panel 52. Specifically, means 100 on the non-spine side of bottom tray 22 is pivotally engaged with means 110 of the base panel 52. This is accomplished by providing first pivot means at one or more positions on base panel 52 spaced along non-spine wall portion 66a and, at a corresponding location or locations along the non-spine side 49 of bottom tray 22, providing second pivot means for engaging the first pivot means for pivotally attaching the bottom tray 22 to the base panel 52. In this manner, as each succeeding tray, in order, is pivoted from the original stack about the flexible hinge to form a second stack of trays next to the original stack of trays, the height of the second stack grows. In FIG. 6 the height of each tray is about the same as an equal number of trays have been pivoted from the first stack onto the second stack as have been left in the first stack. At this point, the bottom tray 22 has not yet started to pivot. However, as the next tray is pivoted, and with each succeeding tray which is pivoted, from the original stack to the second stack, the height of the second stack grows while the height of the first stack diminishes. Just as soon as the second stack contains one more tray than the first stack, bottom tray 22 begins to pivot such that its spine side rises while its non-spine side remains pivotally attached to the base panel 52. In FIG. 7 all but one of the trays has been pivoted from the original stack to the second stack. It is abundantly clear from this illustration how much the spine side of bottom tray 22 has risen to avoid placing stress on the flexible fabric holding the hinge edges of the trays in alignment. Moreover, inasmuch as this configuration obviates the need to affix, as with an adhesive, the entire underside of the bottom tray 22 to the base panel 52, the problem of stress on the bottom tray-base panel face-to-face interface causing them to separate is avoided.

With reference to FIGS. 9-12, in a preferred embodiment of the invention, means 100 on the non-spine side 49 of bottom tray 22 comprises a transversely extending, relatively short (about ¼ to 1 inch in length) slot 102, which may be formed at spaced locations along the non-spine side 49 of bottom tray 22. Desirably, the slot 102 is formed at the intersection of the planar surface 36 and the depending flange 39 along the non-spine side 49 of the bottom tray 22. In this manner, a portion 39a of the depending flange 39 remains beneath the slot 102. Means 110, according to one aspect of the invention, comprises first and second posts 112, 114, extending upwardly from base panel 52, which are positioned inwardly adjacent and along non-spine side wall portion 66a at locations corresponding to the locations of slots 102. First post 112 rises from base panel 52 and is generally "P"-shaped, with the head of the "P" facing toward the non-spine side wall portion 66a. Second post 114 also rises from base panel 52 and is positioned adjacent first post 112, between first post 112 and wall portion 66a. The head of the "P" and the upper end of the second post 114 are tapered toward each other for defining between them an upwardly opening truncated cone defining an insertion slot 116 which has a width at its upper edge at least as wide as the thickness of the depending flange 38 of tray 22. The truncated cone tapers downwardly toward a space 118 between first and second posts 112, 114 and bordered on the bottom by base panel 52 and on the top by the underside of the "P", which is desirably perpendicular to the leg of post 112. When the stack of trays is inserted into the base 51, it is oriented in such a manner that the depending flange portion 39a beneath the slot 102 are inserted into the insertion slot 116 of means 110 with sufficient downward force that flange wall portion 39a moves past the narrow portion of the insertion slot 116 into the space 118 with the head of the "P" of post 112 projecting into the slot 102. In this manner bottom tray 22 is snap fit onto and pivotally mounted in base 51 and post 114 serves to restrict movement of the trays toward non-spine wall portion 66a. In order to be certain that tray 22 is able to pivot easily, the dimensions of the slots 102, the posts 112, 114, and the distance between the posts 112, 114 should be selected appropriately.

It will be appreciated that the embodiment described for pivotally mounting the tray stack within base 51 represents only the preferred manner of so doing. Other configurations for pivotally mounting the tray stack within base 51 may also be utilized and are within the scope of the present invention. For example, other means for snap-fitting may be used. Means for attaching other than snap-fitting can also be utilized. In addition, the bottom tray may be mounted to the inside of the non-spine wall portion 66a instead of to the base panel 52.

There is ample opportunity for the placement of promotional and informational materials on and in the package 10. For example, a promotional or informational sheet may be adhered to the underside of one or more of the trays. Another promotional or informational sheet may be attached along the outside of the cover panel 56, spine panel 54 and base panel 52 and adhered thereto, for example, by adhesive along its entire length or at spaced locations. In addition, S-shaped latches 88 are positioned spaced along and attached along the transverse edge 76 of the inside of the cover panel 56 with the latches opening and extending toward the spine 53. Promotional or informational brochures or sheets may be removably inserted under the latches 88 on the inside of the cover panel 56

While the present invention has been described in terms of specific embodiments thereof, it will be understood that no limitations are intended to the details of construction or design other than as defined in the appended claims.

The invention claimed is:

1. A package for holding media discs, comprising:
a stack of disc-holding trays including at least a top tray and a bottom tray, each tray in the stack having means for receiving and holding a media disc thereon, each tray in the stack having a hinge edge and an opposite edge, the hinge edges of the trays being aligned with each other, and a flexible hinge member affixed to the hinge edges, the flexible hinge member hinging the trays to each other at the hinge edges;
an enclosure comprising a base, a spine and a cover for receiving said stack of disc-holding trays within said base with said hinge edges adjacent said spine and said opposite edges remote from said spine, said enclosure having an open position in which media discs can be inserted onto and removed from the disc-holding trays and said trays can pivot about said flexible hinge member to form a second stack of trays and a closed position in which said cover is pivoted about said spine to enclose the stack of disc-holding trays within said base;
the bottom tray in said stack of disc-holding trays being mounted in said base for pivotal movement about said opposite edge;
whereby, with the enclosure in its open position, as trays are pivoted about said flexible hinge member from said stack onto a second stack, the hinge edge of said bottom tray pivots away from said base when said second stack contains at least one more tray than the original stack.

2. A package, as claimed in claim 1, including first means on said bottom tray and second means on said base, said first and second means interengaging for mounting said bottom tray for pivotal movement in said base.

3. A package, as claimed in claim 2, wherein said first means is on said opposite edge of said bottom tray.

4. A package, as claimed in claim 2, wherein said first means is a part of said opposite edge of said bottom tray.

5. A package, as claimed in claim 2, wherein said base includes a floor panel and said second means is mounted on said floor panel.

6. A package, as claimed in claim 5, including wherein said floor panel includes an upstanding wall adjacent the opposite edges of said tray stack.

7. A package, as claimed in claim 6, wherein said second means is mounted on said floor panel adjacent said upstanding wall.

8. A package, as claimed in claim 5, wherein said first means is on said opposite edge of said bottom tray and including at least two of said first means spaced along said opposite edge and a corresponding number of second means spaced along said floor panel.

9. A package, as claimed in claim 5, wherein said first means is a part of said opposite edge of said bottom tray.

10. A package, as claimed in claim 9, wherein said first means is a slot formed in and extending along said opposite edge of said bottom tray, a portion of said tray remaining below said slot, and said second means comprises means mounted on said floor panel and extending upwardly therefrom, said upwardly extending means having an upwardly opening pivot bore therein, said bore extending in a direction substantially parallel to said opposite edge of said bottom tray and being dimensioned to receive and pivotably retain the portion of said tray remaining below said slot.

11. An package, as claimed in claim 9, wherein said tray comprises a planar upper surface and a depending flange extending at least along said opposite edge of said planar upper surface, said first means comprising a slot formed along the intersection of said planar surface and said depending flange along said opposite edge, a portion of said slot extending onto said planar upper surface and another portion of said slot extending onto said depending flange, a portion of said depending flange remaining below said slot.

12. A package, as claimed in claim 11, wherein said second means comprises a pair of generally parallel posts upstanding from said floor panel, said posts being spaced apart at their upper and lower portions a distance at least equal to the width of said depending flange and being spaced apart intermediate their upper and lower portions a distance less than the thickness of said depending flange, whereby the depending flange portion below said slot is inserted into the space between said slots and forced downwardly until said depending flange portion is pressed past the intermediate narrow space between the posts into the space between their lower portions.

13. A package, as claimed in claim 10, including at least two of said first means spaced along said opposite edge and a corresponding number of second means spaced along said floor panel.

14. A package, as claimed in claim 12, including at least two of said first means spaced along said opposite edge and a corresponding number of second means spaced along said floor panel.

* * * * *